(12) United States Patent
Tang et al.

(10) Patent No.: US 8,160,975 B2
(45) Date of Patent: Apr. 17, 2012

(54) GRANULAR SUPPORT VECTOR MACHINE WITH RANDOM GRANULARITY

(75) Inventors: Yuchun Tang, Atlanta, GA (US); Yuanchen He, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 778 days.

(21) Appl. No.: 12/020,253

(22) Filed: Jan. 25, 2008

(65) Prior Publication Data
US 2009/0192955 A1    Jul. 30, 2009

(51) Int. Cl.
G06F 15/18    (2006.01)
(52) U.S. Cl. .......................................... 706/12
(58) Field of Classification Search .................. None
See application file for complete search history.

(56) References Cited

U.S. PATENT DOCUMENTS

| | | |
|---|---|---|
| 4,289,930 A | 9/1981 | Connolly et al. |
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |

(Continued)

FOREIGN PATENT DOCUMENTS

CA    2564533    12/2005

(Continued)

OTHER PUBLICATIONS

Drucker et al; "Support Vector Machines for Spam Categorization"; 1999; IEEE Transactions on Neural Networks; vol. 10, No. 5; pp. 1048-1054.*

(Continued)

Primary Examiner — Jeffrey A Gaffin
Assistant Examiner — Stanley K Hill
(74) Attorney, Agent, or Firm — Fish & Richardson P.C.

(57) ABSTRACT

Methods and systems for granular support vector machines. Granular support vector machines can randomly select samples of datapoints and project the samples of datapoints into a randomly selected subspaces to derive granules. A support vector machine can then be used to identify hyperplane classifiers respectively associated with the granules. The hyperplane classifiers can be used on an unknown datapoint to provide a plurality of predictions which can be aggregated to provide a final prediction associated with the datapoint.

23 Claims, 7 Drawing Sheets

U.S. PATENT DOCUMENTS

| | | |
|---|---|---|
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Becker et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,185,689 B1 | 2/2001 | Todd, Sr. et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,269,447 B1 | 7/2001 | Maloney et al. |
| 6,269,456 B1 | 7/2001 | Hodges et al. |

| | | | | | |
|---|---|---|---|---|---|
| 6,272,532 B1 | 8/2001 | Feinleib | 2002/0199095 A1 | 12/2002 | Bandini et al. |
| 6,275,942 B1 | 8/2001 | Bernhard et al. | 2003/0005326 A1 | 1/2003 | Flemming |
| 6,279,113 B1 | 8/2001 | Vaidya | 2003/0009554 A1 | 1/2003 | Burch et al. |
| 6,279,133 B1 | 8/2001 | Vafai et al. | 2003/0009693 A1 | 1/2003 | Brock et al. |
| 6,282,565 B1 | 8/2001 | Shaw et al. | 2003/0009696 A1 | 1/2003 | Bunker et al. |
| 6,285,991 B1 | 9/2001 | Powar | 2003/0009699 A1 | 1/2003 | Gupta et al. |
| 6,289,214 B1 | 9/2001 | Backstrom | 2003/0014664 A1 | 1/2003 | Hentunen |
| 6,298,445 B1 | 10/2001 | Shostack et al. | 2003/0023692 A1 | 1/2003 | Moroo |
| 6,301,668 B1 | 10/2001 | Gleichauf et al. | 2003/0023695 A1 | 1/2003 | Kobata et al. |
| 6,304,898 B1 | 10/2001 | Shiigi | 2003/0023873 A1 | 1/2003 | Ben-Itzhak |
| 6,304,973 B1 | 10/2001 | Williams | 2003/0023874 A1 | 1/2003 | Prokupets et al. |
| 6,311,207 B1 | 10/2001 | Mighdoll et al. | 2003/0023875 A1 | 1/2003 | Hursey et al. |
| 6,317,829 B1 | 11/2001 | Van Oorschot | 2003/0028803 A1 | 2/2003 | Bunker et al. |
| 6,320,948 B1 | 11/2001 | Heilmann et al. | 2003/0033516 A1 | 2/2003 | Howard et al. |
| 6,321,267 B1 | 11/2001 | Donaldson | 2003/0033542 A1 | 2/2003 | Goseva-Popstojanova et al. |
| 6,324,569 B1 | 11/2001 | Ogilvie et al. | 2003/0041264 A1 | 2/2003 | Black et al. |
| 6,324,647 B1 | 11/2001 | Bowman-Amuah | 2003/0051026 A1 | 3/2003 | Carter et al. |
| 6,324,656 B1 | 11/2001 | Gleichauf et al. | 2003/0051163 A1 | 3/2003 | Bidaud |
| 6,330,589 B1 | 12/2001 | Kennedy | 2003/0051168 A1 | 3/2003 | King et al. |
| 6,347,374 B1 | 2/2002 | Drake et al. | 2003/0055931 A1 | 3/2003 | Cravo De Almeida et al. |
| 6,353,886 B1 | 3/2002 | Howard et al. | 2003/0061506 A1 | 3/2003 | Cooper et al. |
| 6,363,489 B1 | 3/2002 | Comay et al. | 2003/0065943 A1 | 4/2003 | Geis et al. |
| 6,370,648 B1 | 4/2002 | Diep | 2003/0084280 A1 | 5/2003 | Bryan et al. |
| 6,373,950 B1 | 4/2002 | Rowney | 2003/0084320 A1 | 5/2003 | Tarquini et al. |
| 6,385,655 B1 | 5/2002 | Smith et al. | 2003/0084323 A1 | 5/2003 | Gales |
| 6,393,465 B2 | 5/2002 | Leeds | 2003/0084347 A1 | 5/2003 | Luzzatto |
| 6,393,568 B1 | 5/2002 | Ranger et al. | 2003/0088792 A1 | 5/2003 | Card et al. |
| 6,405,318 B1 | 6/2002 | Rowland | 2003/0093667 A1 | 5/2003 | Dutta et al. |
| 6,442,588 B1 | 8/2002 | Clark et al. | 2003/0093695 A1 | 5/2003 | Dutta |
| 6,442,686 B1 | 8/2002 | McArdle et al. | 2003/0093696 A1 | 5/2003 | Sugimoto |
| 6,453,345 B2 | 9/2002 | Trcka et al. | 2003/0095555 A1 | 5/2003 | McNamara et al. |
| 6,460,141 B1 | 10/2002 | Olden | 2003/0097439 A1 | 5/2003 | Strayer et al. |
| 6,470,086 B1 | 10/2002 | Smith | 2003/0097564 A1 | 5/2003 | Tewari et al. |
| 6,487,599 B1 | 11/2002 | Smith et al. | 2003/0105976 A1 | 6/2003 | Copeland, III |
| 6,487,666 B1 | 11/2002 | Shanklin et al. | 2003/0110392 A1 | 6/2003 | Aucsmith et al. |
| 6,502,191 B1 | 12/2002 | Smith et al. | 2003/0110396 A1 | 6/2003 | Lewis et al. |
| 6,516,411 B2 | 2/2003 | Smith | 2003/0115485 A1 | 6/2003 | Milliken |
| 6,519,703 B1 | 2/2003 | Joyce | 2003/0115486 A1 | 6/2003 | Choi et al. |
| 6,539,430 B1 | 3/2003 | Humes | 2003/0123665 A1 | 7/2003 | Dunstan et al. |
| 6,546,416 B1 | 4/2003 | Kirsch | 2003/0126464 A1 | 7/2003 | McDaniel et al. |
| 6,546,493 B1 | 4/2003 | Magdych et al. | 2003/0126472 A1 | 7/2003 | Banzhof |
| 6,550,012 B1 | 4/2003 | Villa et al. | 2003/0135749 A1 | 7/2003 | Gales et al. |
| 6,574,737 B1 | 6/2003 | Kingsford et al. | 2003/0140137 A1 | 7/2003 | Joiner et al. |
| 6,662,170 B1 | 12/2003 | Dom et al. | 2003/0140250 A1 | 7/2003 | Taninaka et al. |
| 6,892,178 B1 | 5/2005 | Zacharia | 2003/0145212 A1 | 7/2003 | Crumly |
| 6,892,179 B1 | 5/2005 | Zacharia | 2003/0145225 A1 | 7/2003 | Bruton, III et al. |
| 6,895,385 B1 | 5/2005 | Zacharia et al. | 2003/0145226 A1 | 7/2003 | Bruton, III et al. |
| 6,941,348 B2 | 9/2005 | Petry et al. | 2003/0149887 A1 | 8/2003 | Yadav |
| 7,519,563 B1 * | 4/2009 | Urmanov et al. ............ 706/12 | 2003/0149888 A1 | 8/2003 | Yadav |
| 2001/0049793 A1 | 12/2001 | Sugimoto | 2003/0154393 A1 | 8/2003 | Young |
| 2002/0004902 A1 | 1/2002 | Toh et al. | 2003/0154399 A1 | 8/2003 | Zuk et al. |
| 2002/0016910 A1 | 2/2002 | Wright et al. | 2003/0154402 A1 | 8/2003 | Pandit et al. |
| 2002/0023140 A1 | 2/2002 | Hile et al. | 2003/0158905 A1 | 8/2003 | Petry et al. |
| 2002/0026591 A1 | 2/2002 | Hartley et al. | 2003/0159069 A1 | 8/2003 | Choi et al. |
| 2002/0032871 A1 | 3/2002 | Malan et al. | 2003/0159070 A1 | 8/2003 | Mayer et al. |
| 2002/0035683 A1 | 3/2002 | Kaashoek et al. | 2003/0167402 A1 | 9/2003 | Stolfo et al. |
| 2002/0042876 A1 | 4/2002 | Smith | 2003/0172166 A1 | 9/2003 | Judge et al. |
| 2002/0046041 A1 | 4/2002 | Lang | 2003/0172167 A1 | 9/2003 | Judge et al. |
| 2002/0049853 A1 | 4/2002 | Chu et al. | 2003/0172289 A1 | 9/2003 | Soppera |
| 2002/0078382 A1 | 6/2002 | Sheikh et al. | 2003/0172291 A1 | 9/2003 | Judge et al. |
| 2002/0087882 A1 | 7/2002 | Schneier et al. | 2003/0172292 A1 | 9/2003 | Judge |
| 2002/0095492 A1 | 7/2002 | Kaashoek et al. | 2003/0172294 A1 | 9/2003 | Judge |
| 2002/0112185 A1 | 8/2002 | Hodges | 2003/0172301 A1 | 9/2003 | Judge et al. |
| 2002/0116627 A1 | 8/2002 | Tarbotton et al. | 2003/0172302 A1 | 9/2003 | Judge et al. |
| 2002/0120853 A1 | 8/2002 | Tyree | 2003/0187996 A1 | 10/2003 | Cardina et al. |
| 2002/0133365 A1 | 9/2002 | Grey et al. | 2003/0212791 A1 | 11/2003 | Pickup |
| 2002/0138416 A1 | 9/2002 | Lovejoy et al. | 2003/0233328 A1 | 12/2003 | Scott et al. |
| 2002/0138755 A1 | 9/2002 | Ko | 2004/0015554 A1 | 1/2004 | Wilson |
| 2002/0138759 A1 | 9/2002 | Dutta | 2004/0025044 A1 | 2/2004 | Day |
| 2002/0138762 A1 | 9/2002 | Horne | 2004/0054886 A1 | 3/2004 | Dickinson et al. |
| 2002/0143963 A1 | 10/2002 | Converse et al. | 2004/0058673 A1 | 3/2004 | Irlam et al. |
| 2002/0147734 A1 | 10/2002 | Shoup et al. | 2004/0059811 A1 | 3/2004 | Sugauchi et al. |
| 2002/0152399 A1 | 10/2002 | Smith | 2004/0088570 A1 | 5/2004 | Roberts et al. |
| 2002/0165971 A1 | 11/2002 | Baron | 2004/0111531 A1 | 6/2004 | Staniford et al. |
| 2002/0172367 A1 | 11/2002 | Mulder et al. | 2004/0139160 A1 | 7/2004 | Wallace et al. |
| 2002/0178227 A1 | 11/2002 | Matsa et al. | 2004/0139334 A1 | 7/2004 | Wiseman |
| 2002/0178383 A1 | 11/2002 | Hrabik et al. | 2004/0177120 A1 | 9/2004 | Kirsch |
| 2002/0188864 A1 | 12/2002 | Jackson | 2004/0203589 A1 | 10/2004 | Wang et al. |
| 2002/0194469 A1 | 12/2002 | Dominique et al. | 2004/0205135 A1 | 10/2004 | Hallam-Baker |

| | | | |
|---|---|---|---|
| 2004/0267893 | A1 | 12/2004 | Lin |
| 2005/0021738 | A1 | 1/2005 | Goeller |
| 2005/0052998 | A1 | 3/2005 | Oliver et al. |
| 2005/0065810 | A1 | 3/2005 | Bouron |
| 2005/0102366 | A1 | 5/2005 | Kirsch |
| 2005/0262209 | A1 | 11/2005 | Yu |
| 2005/0262210 | A1 | 11/2005 | Yu |
| 2006/0036727 | A1 | 2/2006 | Kurapati et al. |
| 2006/0042483 | A1 | 3/2006 | Work et al. |
| 2006/0095404 | A1 | 5/2006 | Adelman et al. |
| 2006/0112026 | A1 | 5/2006 | Graf et al. |
| 2006/0123083 | A1 | 6/2006 | Goutte et al. |
| 2006/0212925 | A1 | 9/2006 | Shull et al. |
| 2006/0212930 | A1 | 9/2006 | Shull et al. |
| 2006/0212931 | A1 | 9/2006 | Shull et al. |
| 2006/0230039 | A1 | 10/2006 | Shull et al. |
| 2006/0253458 | A1 | 11/2006 | Dixon et al. |
| 2007/0239642 | A1 | 10/2007 | Sindhwani et al. |
| 2008/0177684 | A1* | 7/2008 | Laxman et al. ............... 706/20 |
| 2009/0089279 | A1* | 4/2009 | Jeong et al. ..................... 707/5 |

FOREIGN PATENT DOCUMENTS

| | | | |
|---|---|---|---|
| EP | 0375138 | A2 | 6/1990 |
| EP | 0413537 | A2 | 2/1991 |
| EP | 0420779 | A2 | 4/1991 |
| EP | 0720333 | A2 | 7/1996 |
| EP | 0838774 | A2 | 4/1998 |
| EP | 0869652 | A2 | 10/1998 |
| EP | 0907120 | A2 | 4/1999 |
| EP | 1326376 | * | 7/2003 |
| EP | 1271846 | * | 7/2005 |
| GB | 2271002 | * | 3/1994 |
| JP | 18350870 | | 12/2006 |
| KR | 2006-0012137 | | 2/2006 |
| KR | 1020060041934 | * | 5/2006 |
| WO | WO 96/35994 | * | 11/1996 |
| WO | WO 99/05814 | * | 2/1999 |
| WO | WO 99/33188 | * | 7/1999 |
| WO | WO 99/37066 | * | 7/1999 |
| WO | WO 00/42748 | * | 7/2000 |
| WO | WO 01/17165 | * | 3/2001 |
| WO | WO 01/50691 | * | 7/2001 |
| WO | WO 01/76181 | * | 10/2001 |
| WO | WO 02/13469 | * | 2/2002 |
| WO | WO 02/13489 | * | 2/2002 |
| WO | WO 02/075547 | * | 9/2002 |
| WO | WO 02/091706 | * | 11/2002 |
| WO | WO 2004/061703 | | 7/2004 |
| WO | WO 2004/081734 | | 9/2004 |
| WO | WO 2005/116851 | | 12/2005 |

OTHER PUBLICATIONS

Graf et al.; "Parallel Support Vector Machines: The Cascade SVM"; 2005; pp. 1-8.*
Yao, J. T. and Yao, Y. Y; "A Granular Computing Approach to Machine Learning"; 2002; Proceedings of the 1st International Conference on Fuzzy Systems and Knowledge Discovery; pp. 1-5.*
Rokach, Lior et al.; "Decomposition methodology for classification tasks"; 2005; Springer-Verlag London Limited; Pattern Analysis & Applications; pp. 257-271.*
Wang, Jigang et al.; "Training Data Selection for Support Vector Machines"; 2005; ICNC 2005, LNCS 3610; pp. 554-564.*
Skurichina, Marina et al.; Bagging, Boosting and the Random Subspce Method for Linear Classifiers; 2002; Springer-Verlag London Limited; pp. 121-135.*
Tao, Dacheng et al.; "Asymmetric Bagging and Random Subspace for Support Vector Machines-Based Relevance Feedback in Image Retrieval"; 2006; IEEE Computer Society; pp. 1088-1099.*
Kotsiantis, S. B. et al.; "Machine learning: a review of classification and combining techniques"; 2006; Springer; Artificial Intelligence Review; pp. 159-190.*
Article entitled "An Example-Based Mapping Method for Text Categorization and Retrieval" by Yang et. al., in *ACM Transactions on Information Systems*, Jul. 1994, vol. 12, No. 3, pp. 252-277.
Article entitled "A Comparison of Two Learning Algorithms for Text Categorization" by Lewis et al., in Third Annual Symposium on *Document Analysis and Information Retrieval*, Apr. 11-13, 1994, pp. 81-92.
Article entitled "Learning Limited Dependence Bayesian Classifiers" by Sahami, in *Proceedings of the Second International Conference on Knowledge Discovery and Data Mining*, 1996, pp. 335-338.
Article entitled "An Evaluation of Phrasal and Clustered Representations on a Text Categorization Task" by Lewis, in *15th Ann Int'l SIGIR*, Jun. 1992, pp. 37-50.
Book entitled *Machine Learning* by Mitchell, 1997, pp. 180-184.
Article entitled "Learning Rules that Classify E-mail" by Cohen, pp. 1-8. Date unknown.
Article entitled "Hierarchically classifying documents using very few words" by Koller et. al., in *Proceedings of the Fourteenth International Conference on Machine Learning*, 1997.
Article entitled "Classification of Text Documents" by Li et. al., in *The Computer Journal*, vol. 41, No. 8, 1998, pp. 537-546.
Article entitled "Issues when designing filters in messaging systems" by Palme et. al., in 19 *Computer Communications*, 1996, pp. 95-101.
Article entitled "Text Categorization with Support Vector Machines: Learning with Many Relevant Features" by Joachins in *Machine Learning: ECML-98*, Apr. 1998, pp. 1-14.
Article entitled "Hierarchical Bayesian Clustering for Automatic Text Classification" by Iwayama et al. in *Natural Language*, pp. 1322-1327. Date unknown.
Article entitled "Smokey: Automatic Recognition of Hostile Messages" by Spertus in *Innovative Applications* 1997, pp. 1058-1065.
Article entitled "A Comparison of Classifiers and Document Representations for the Routing Problem" by Schutze. Date unknown.
Article entitled "CAFE: A Conceptual Model for Managing Information in Electronic Mail" by Takkinen et al. In *Proc. 31st Annual Hawaii International Conference on System Sciences*, 1998, pp. 44-53.
Article entitled "A Comparative Study on Feature Selection in Text Categorization" by Yang et. al. Date unknown.
Article entitled "Spam!" by Cranor et. al. In *Communications Of The ACM*, vol. 41, No. 8, Aug. 1998, pp. 74-83.
Article entitled "Sendmail and Spam" by LeFebvre in *Performance Computing*, Aug. 1998, pp. 55-58.
Article entitled "Implementing a Generalized Tool for Network Monitoring" by Ranum et. al. in *LISA XI*, Oct. 26-31, 1997, pp. 1-8.
Article entitled "Method for Automatic Contextual Transposition Upon Receipt of Item of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces. www.atabok.com.
Website: ATABOK VCN Auto-Exchange™ —Atabok Related Produces. www.atabok.com.
Website: Controlling Digital Assets Is a Paramount Need for All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical/Interoperability—Entrust Entelligence. www.entrust.com.
Website: E-mail Plug-in—Get Technical/System Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—Eske. www.danu.ie.
Website: Terminet—ESKE. www.danu.ie.
Website: Baltimore Focus on e-Security—Baltimore Technologies. www.baltimore.com.

Article entitled "Securing Electronic Mail Systems" by Serenelli et al., in *Communications-Fusing Command Control and Intelligence: MILCOM '92*, 1992, pp. 677-680.

Article entitled "Integralis' Minesweeper defuses E-mail bombs" by Kramer et. al., in *PC Week*, Mar. 18, 1996, p. N17-N23.

Article entitled "A Toolkit and Methods for Internet Firewalls" by Ranum et. al., in *Proc of USENIX 1994 Technical Conference*, Jun. 6-10, 1994, pp. 37-44.

Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.

Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.

Article entitled "Designing an Academic Firewall: Policy, Practice, and Experience with SURF" by Greenwald et. al., in *Proc. of the 1996 Symposium on Network and Distributed Systems Security*, 1996, pp. 1-14. Firewall: Policy, Practice, and Experience with Proc. Of the 1996 Symposium on Network and Distributed.

Article entitled "X Through the Firewall, and Other Application Relays" by Treese et. al. in *Proc. of the USENIX Summer 1993 Technical Conference*, Jun. 21-25, 1993, pp. 87-99.

Article entitled "Firewalls for Sale" by Bryan, in *BYTE*, Apr. 1995, pp. 99-104.

Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.

Article entitled "Safe Use of X Window System Protocol Across a Firewall" by Kahn, in *Proc. of the Fifth USENIX UNIX Security Symposium*, Jun. 5-7, 1995, pp. 105-116.

Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.

Article entitled "A Secure Email Gateway (Building an RCAS External Interface)" by Smith, in *Tenth Annual Computer Security Applications Conference*, Dec. 5-9, 1994, pp. 202-211.

Article entitled "Secure External References in Multimedia Email Messages" by Wiegel, in *3rd ACM Conference on Computer and Communications Security*, Mar. 14-16, 1996, pp. 11-18.

Memo entitled "SOCKS Protocol Version 5" by Leech et. al., in *Standards Track*, Mar. 1996, pp. 1-9.

Article entitled "Securing the Web: fire walls, proxy servers, and data driver attacks" by Farrow in *InfoWorld*, Jun. 19, 1995, vol. 17, No. 25, p. 103.

Website: Go Secure! for Microsoft Exchange—Products/Services—Verisign, Inc. www.verisign.com.

Article entitled "MIMEsweeper defuses virus network, 'Net mails bombs" by Avery, in *Info World*, May 20, 1996, vol. 12, No. 21, p. N1.

Article entitled "Stomping out mail viruses" by Wilkerson, in *PC Week*, Jul. 15, 1996, p. N8.

PCT Application—PCT/US2009/031853, International Search Report and Written Opinion, mailed Sep. 8, 2009, 11 pages.

Yuchun Tang, "Granular Support Vector Machines Based on Granular Computing, Soft Computing and Statistical Learning." Georgia State University: May 2006.

* cited by examiner

GRANULAR SUPPORT VECTOR MACHINE WITH RANDOM GRANULARITY

BACKGROUND AND FIELD

This disclosure relates generally to data mining using support vector machines.

Support vector machines are useful in providing input to identify trends in existing data and to classify new sets of data for analysis. Generally support vector machines can be visualized by plotting data into an n-dimensional space, n being the number of attributes associated with the item to be classified. However, given large numbers of attributes and a large volume of training data, support vector machines can be processor intensive.

Recently analysts have developed an algorithm known as "Random Forests." "Random Forests" uses decision trees to classify data. Decision trees modeled on large amounts of data can be difficult to parse and hence classification accuracy is limited. Thus, "Random Forests" utilizes a bootstrap aggregating (bagging) algorithm to randomly generate multiple bootstrapping datasets from a training dataset. Then a decision tree is modeled on each bootstrapping dataset. For each decision tree modeling, at each node a small fraction of attributes are randomly selected to determine the split. Because all attributes need to be available for random selection, the whole bootstrapping dataset is needed in the memory. Moreover, "Random Forests" has difficulty working with sparse data (e.g., data which contains many zeroes). For example, a dataset, formatted as a matrix with rows as samples and columns as attributes, has to be entirely loaded into the memory even when a cell is zero. Thus, "Random Forests" is space-consuming, and when modeling the entire data matrix, "Random Forests" is also time-consuming, given a large and sparse dataset. The dataset cannot be parallelized on a distributed system such as a computer cluster, because it is time-consuming to transfer a whole bootstrapping dataset between different computer nodes.

SUMMARY

Systems, methods, apparatuses and computer program products for granular support vector machines are provided. In one aspect, methods are disclosed, which include: receiving a training dataset comprising a plurality of tuples and a plurality of attributes for each of the tuples; deriving a plurality of granules from the training dataset, each granule comprising a plurality of sample tuples and a plurality of sample attributes; processing the granules using a support vector machine process to identify a hyperplane classifier associated with each of the granules; predicting a classification of a new tuple using each of the hyperplane classifiers to produce a plurality of predictions; and aggregating the predictions to derive a decision on a final classification of the new tuple.

Systems can include a granule selection module, multiple granule processing modules, one or more prediction modules and an aggregation module. The granule selection module can select a plurality of granules from a training dataset. Each of the granules can include multiple tuples and attributes. The granule processing modules can process granules using support vector machine processes identifying a hyperplane classifier associated with each of the granules. The one or more prediction modules can predict a classification associated with an unknown tuple based upon the hyperplane classifiers to produce multiple granule predictions. The aggregation module can aggregate the granule predictions to derive a decision on a final classification associated with the unknown tuple.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Granular support vector machines with random granularity can help to provide efficient and accurate classification of many types of data. For example, granular support vector machines can be used in the context of spam classification. Moreover, in some implementations, the granules, typically much smaller than the bootstrapping datasets before random subspace projection, can be distributed across many processors, such that the granules can be processed in parallel. In other implementations, the granules can be distributed based upon spare processing capability at distributed processing modules. The nature of the granules can facilitate distributed processing. The reduction in size of the training dataset can facilitate faster processing of each of the granules. In comparison to "Random Forests", this granular support vector machine with random granularity works well on large and sparsely populated datasets (e.g., data which contains a lot of zeroes or null sets), because all zeros or null sets are not needed in the memory. In some implementations, the classification system can be used to classify spam. In other implementations, the classification system can be used to classify biological data. Other classifications can be derived from any type of dataset using granular support vector machines with random granularity.

Figure 1:
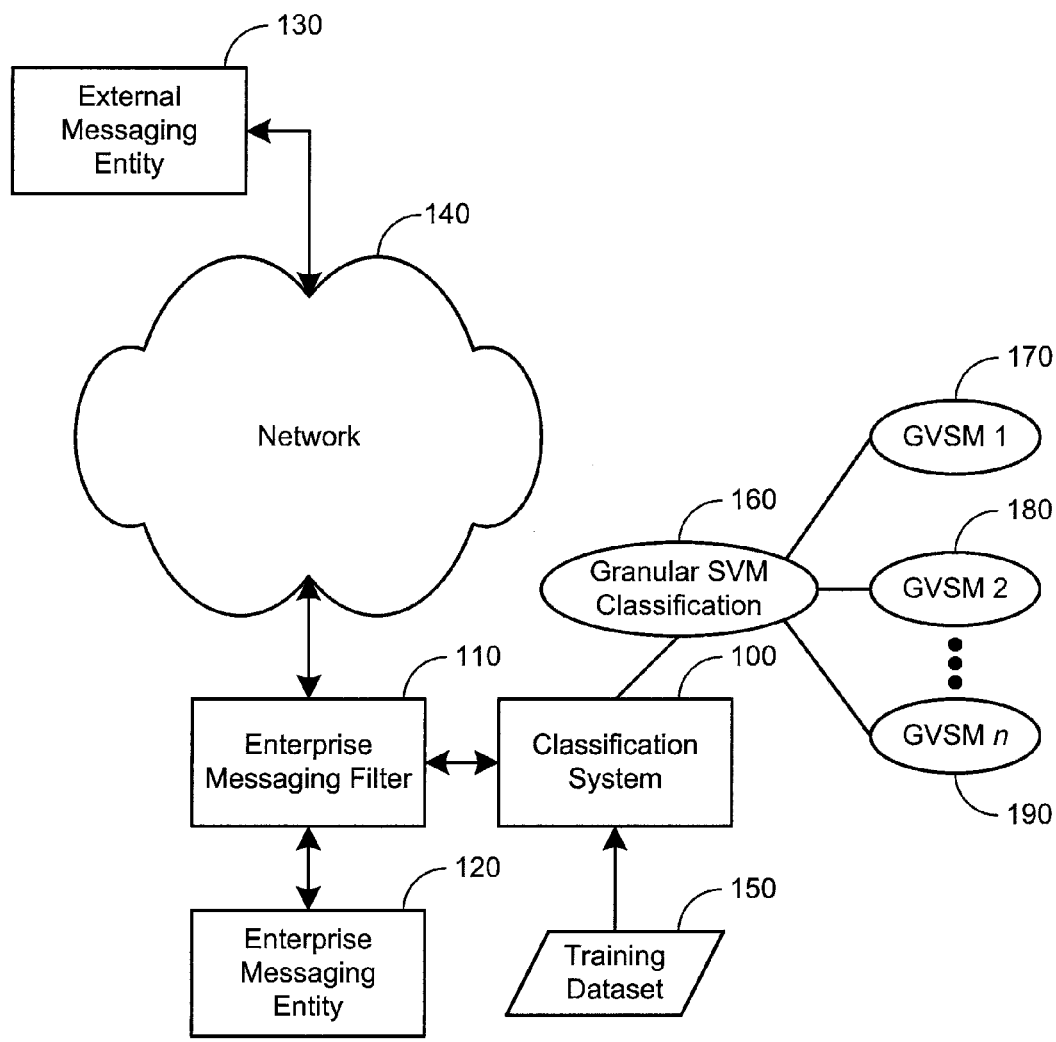
FIG. 1 is a block diagram of a network environment including an example classification system.

FIG. 1 is a block diagram of a network environment including an example classification system 100. The classification system 100 can receive classification queries from an enterprise messaging filter 110. The enterprise messaging filter 110 can protect enterprise messaging entities 120 from external messaging entities 130 attempting to communicate with the enterprise messaging entity 120 through a network 140.

In some implementations, the classification system 100 can receive a training dataset 150. The training dataset 150 can be provided by an administrator, for example. The classification system 100 can use granular support vector machine classification 160 to process the training dataset and derive hyperplane classifiers respectively associated with randomly selected granules, thereby producing a number of granular support vector machines (e.g., GVSM 1 170, GVSM 2 180 . . . GVSM n 190).

In some implementations, the classification system 100 can derive a number of granules from the training dataset. The granules can be derived, for example, using a bootstrapping process whereby a tuple (e.g., a record in the dataset) is randomly selected for inclusion in the in-bag data. Additional tuples can be selected from among the entire training dataset (e.g., sampled with replacement). Thus, the selection of each tuple is independent from the selection of other tuples and the same tuple can be selected more than once. For example, if a training dataset included 100 tuples and 100 bootstrapping samples are selected from among the 100 tuples, on average 63.2 of the tuples would be selected, and 36.8 of the tuples would not be selected. The selected data can be identified as in-bag data, while the non-selected data can be identified as out-of-bag data. In some examples, the sample size can be set at 10% of the total number of tuples in the training dataset. Thus, if there were 100 tuples, the classification system 100 can select 10 samples with replacement.

The classification system 100 can then project the data into a random subspace. The random subspace projection can be a random selection of tuple attributes (e.g., features). In some implementations, the random selection of tuple attributes can be performed without replacement (e.g., no duplicates can be selected). In other implementations, the random selection of tuple attributes can be performed with replacement (e.g., duplicate samples are possible, but discarded). The random selection of tuples with a projection of the tuple attributes into a random subspace generates a granule. The granule can be visualized as a matrix having a number of rows of records (e.g., equal to the number of unique tuples selected from the training dataset) with a number of columns defining attributes associated with the granule.

The classification system 100 can then execute a support vector machine process operable to receive the data and to plot the data into an n-dimensional space (e.g., n being the number of unique tuples sampled during the bootstrapping process). The support vector machine process can identify a hyperplane classifier (e.g., a linear classifier) to find the plane which best separates the data into two or more classifications. In some implementations, adjustments to the support vector machine process can be made to avoid overfitting the hyperplane classifier to the datapoints. In various examples, there can be more than one potential hyperplane classifier which provides separation between the data. In such instances, the hyperplane classifier which achieves maximum separation (e.g., maximum margin classifier) can be identified and selected by the support vector machine process. In some implementations, the support vector machine can warp the random subspace to provide better fit of the hyperplane classifier to the datapoints included in the granule.

The hyperplane classifiers (e.g., GVSM 1 170, GVSM 2 180 . . . GVSM n 190) can then be used to analyze new data. In some implementations, a new tuple (e.g., set of attributes) with an unknown classification can be received. In other implementations, the classification system can receive an unparsed document and can parse the document to extract the attributes used for classification by the various granules.

In some implementations, the hyperplane classifiers can be stored locally to the classification system and can be used to derive a number of predictions for the classification of the new tuple. In other implementations, the hyperplane classifiers are stored by the respective processing modules that processed the granule and the new tuple can be distributed to each of the respective processing modules. The processing modules can then each respond with a predicted granule classification, resulting in a number of granule predictions equal to the number of derived granules.

The predicted classifications can be aggregated to derive a final classification prediction associated with the new tuple. In some implementations, the predicted classifications can be aggregated by majority voting. For example, each prediction can be counted as a "vote." The "votes" can then be tallied and compared to determine which classification received the most "votes." This classification can be adopted by the classification system as the final classification prediction.

In other implementations, the granule predictions can include a distance metric describing the distance of a datapoint associated with the new tuple from the hyperplane classifier. The distance can be used to weight the aggregation of the predicted classifications. For example, if the classification system were determining whether a set of data indicates a man versus a woman, and one hyperplane classifier predicts that the datapoint is associated with a woman while another hyperplane classifier predicts that the same datapoint is associated with a man, the distance of each from the hyperplane classifier can be used to determine which classifier to use as the final classification prediction. In other examples, it can be imagined that 5 hyperplane classifiers predict that the datapoint is associated with a man while 10 hyperplane classifiers predict that the datapoint is associated with a woman. In those implementations where distance is used to provide a weighting to the predictions, if the 5 classifiers predicting that the datapoint is male have a greater aggregate distance from the respective hyperplane classifiers than the 10 classifiers predicting that the datapoint is female, then the final classification prediction can be male.

In still further implementations, each of the hyperplane classifiers can have an effectiveness metric associated with the classifier. In such implementations, the effectiveness metric can be derived by validating the hyperplane classifier against the out-of-bag data not chosen for inclusion in the granule associated with the hyperplane classifier. Thus, for example, using a 10% bootstrapping process on a training sample of 100 records, there are expected to be about 93 out-of-bag tuples (e.g., datapoints). Those datapoints can be used in an attempt to determine the effectiveness of the hyperplane classifier derived with respect to the granule. If the hyperplane classifier, for example, is measured to be 90% effective on the out-of-bag data, the prediction can be weighted at 90%. If another hyperplane classifier is measured, for example, to be 70% effective on the out-of-bag data, the prediction can be weighted at 70%. In some implementations, if a hyperplane classifier is measured to be less than a threshold level of effectiveness on the out-of-bag data, the hyperplane classifier can be discarded. For example, if a hyperplane classifier is less than 50% effective on the out-of-bag data, it is more likely than not that the classification is incorrect (at least as far as the out-of-bag data is concerned). In such instances, it the hyperplane classifier could be based on datapoints which are outliers that do not accurately represent the sample. In some implementations, if a threshold number of hyperplane classifiers are discarded because they do not predict with a threshold effectiveness, the classification system can request a new training dataset, or possibly different and/or additional attributes associated with the current training dataset. In other implementations, the classification system can continue to run the support vector machine processing until a threshold number of hyperplane classifiers are identified.

Figure 2:
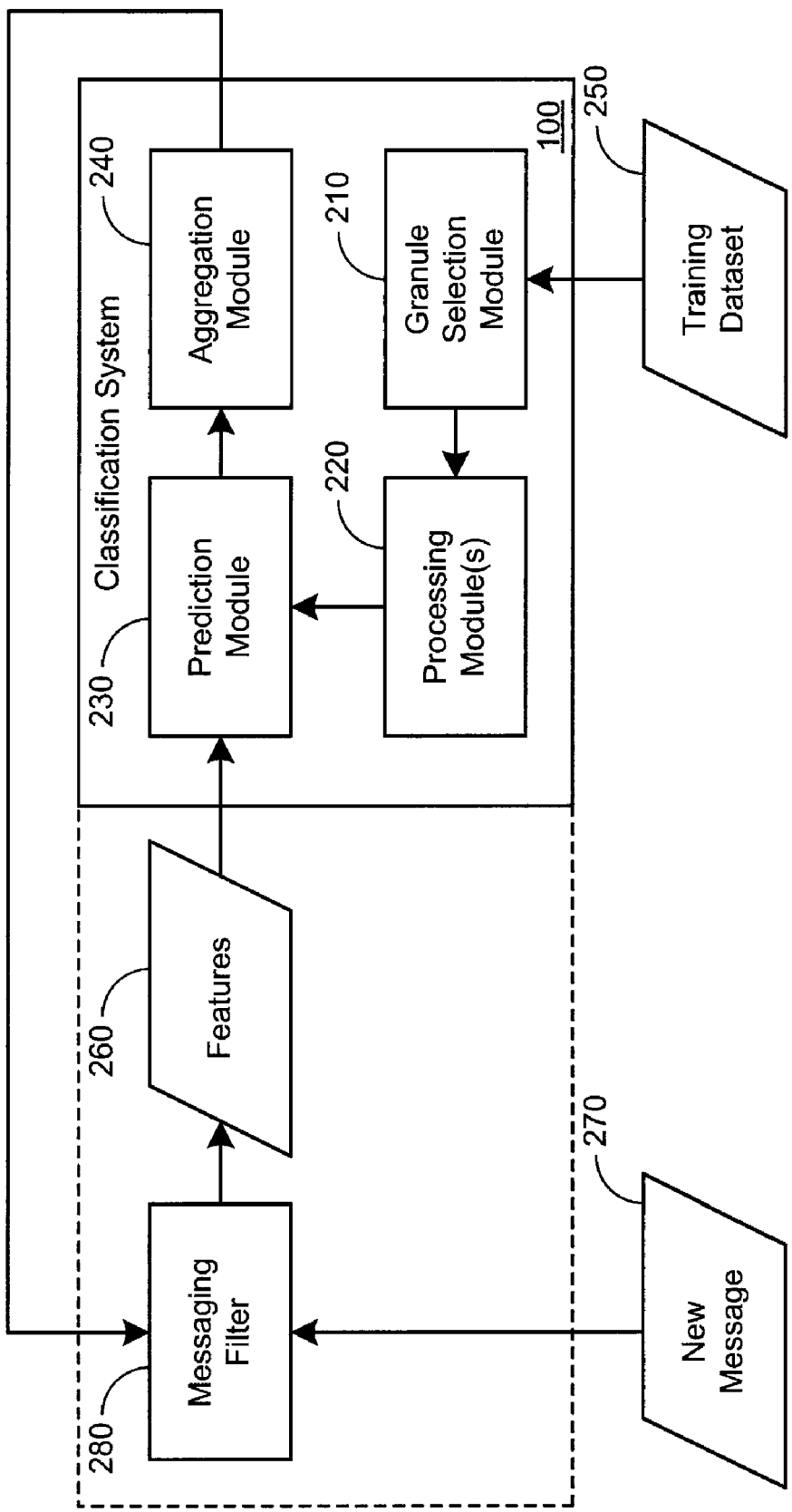
FIG. 2 is a block diagram of an example classification system.

FIG. 2 is a block diagram of an example classification system 100. In some implementations, the classification system 100 can include a granule selection module 210, a processing module 220, a prediction module 230, and an aggregation module 240. The granule selection module 210 can receive a training dataset 250 and can randomly select (with replacement) tuples from the training dataset 250. In some implementations, the random selection of the tuples can be based upon a bootstrapping process, whereby a selection of a tuple is made, the tuple is replaced and then another tuple is selected. In various examples, this process can continue until a threshold number of selections are made. As a specific example, 10% bootstrapping on a 100-tuple training dataset can mean that 10 selections are made (including duplicates). Thus, there are expected to be less than 10 unique sample tuples in the in-bag data, on average.

The in-bag tuples are then projected onto a random subspace. For example, the in-bag tuples can be visualized as datapoints plotted onto an n-dimensional space, where n equals the number of attributes associated with each tuple. If a dimension is removed, the datapoints can be said to be projected into the subspace comprising the remaining attributes. In various implementations, the random subspace can be selected by randomly selecting attributes to remove from the subspace or randomly selecting the attributes that are included in the subspace. In some implementations, the random subspace is chosen by randomly selecting the attributes for inclusion in the granule without replacement (e.g., no duplicates can be selected, because once an attribute is selected, it is removed from the sample). Thus, an original matrix associated with the training dataset can be reduced into a granule. Granules can be continued to be selected until a threshold number of granules have been selected. The random selection of the granules and a smaller sample size can facilitate diversity among the granules. For example, one granule is unlikely to be similar to any of the other granules.

The processing module 220 can be operable to process the granules using a support vector machine process. The processing module 220 can use the support vector machine process to plot the tuples associated with a respective granule into an n-dimensional space, where n equals the number of tuples associated with the granule. The processing module 220 can identify a hyperplane classifier (e.g., linear classifier) which best separates the data based upon the selected category for classification. In some instances, multiple hyperplane classifiers might provide differentiation between the data. In some implementations, the processing module 220 can select the hyperplane classifier that provides maximum separation between the datapoints (e.g., a maximum margin classifier).

In various implementations, the granular nature of the process can facilitate distributed processing of the granules. For example, if there are 10 granules to process on five processors, each of the processors could be assigned to handle two granules. Some implementations can include a distribution module operable to distribute the granules among potentially multiple processing modules 220 (e.g., processors running a support vector machine processes on the granules). In such implementations, the distribution module can, for example, determine the available (e.g., spare) processing capacity and/or specialty processing available on each of a number of processors and assign the granules to the processors accordingly. Other factors for determining distribution of the granules can be used.

The prediction module 230 can receive features 260 (e.g., from an unclassified tuple) for classification. In some implementations, the features 260 can be received from a messaging filter 280. In such implementations, the features 260 can be derived from a received message 270 by a messaging filter 280. The messaging filter 280, for example, can extract the features 260. In some implementations, the messaging filter 280 can be a part of the classification system 100. In other implementations, the messaging filter 280 can query the classification system 100 by sending the attributes associated with the tuple to be classified to the classification system 100.

The prediction module 230 can compare datapoints associated with the features against each of the hyperplane classifiers derived from the granules to derive granule predictions associated with the respective hyperplane classifiers. For example, the prediction module 230 could plot the unclassified new tuple onto a random subspace associated with a first granule and associated hyperplane classifier and determine whether the unclassifier new tuple shows characteristics associated with a first classification (e.g., men) or a characteristics associated with a second classification (e.g., women). The prediction module 230 could continue this process until each of the hyperplane classifiers have been compared to a datapoint associated with the unclassified new tuple.

In some implementations, the prediction module 230 can include distributed processing elements (e.g., processors). In such implementations, the prediction module 230 can distribute classification jobs to processors, for example with available processing capability. In other implementations, the prediction module 230 can distribute classification jobs based upon which processors previously derived the hyperplane classifier associated with a granule. In such implementations, for example, a processor used to derive a first hyperplane classifier for a first granule can also be used to plot an unclassified new tuple into the random subspace associated with the first granule and can compare the datapoint associated with the new tuple to the first hyperplane classifier associated with the first granule.

The granule predictions can be communicated to the aggregation module 240. In some implementations, the aggregation module 240 can use a simple voting process to aggregate the granule predictions. For example, each prediction can be tallied as a "vote" for the classification predicted by the granule prediction. The classification that compiles the most votes can be identified as the final classification decision.

In another implementation, each granule prediction can include a distance metric identifying the distance of datapoints associated with the unclassified new tuple from the respective hyperplane classifiers. The distance metric can be used to weight the respective granule predictions. For example, if there are three predictions, one for classifier A located a distance of 10 units from the hyperplane classifier, and two for classifier B located a distance of 2 and 5 units from their respective hyperplane classifier, then classifier A is weighted at 10 units and classifier B is weighted at 7 units. Thus, in this example, classifier A can be selected as the final classification prediction.

In other implementations, each of the predictions can be weighted by a Bayesian confidence level associated with the respective hyperplane classifiers. In some such implementations, the Bayesian confidence level can be based upon a validation performed on the hyperplane classifier using the out-of-bag data associated with each respective hyperplane classifier. For example, if a first hyperplane classifier is measured to be 85% effective at classifying the out-of-bag data, the predictions associated with the hyperplane classifier can be weighted by the effectiveness metric. The weighted predictions can be summed and compared to each other to determine the final classification prediction.

Figure 3:
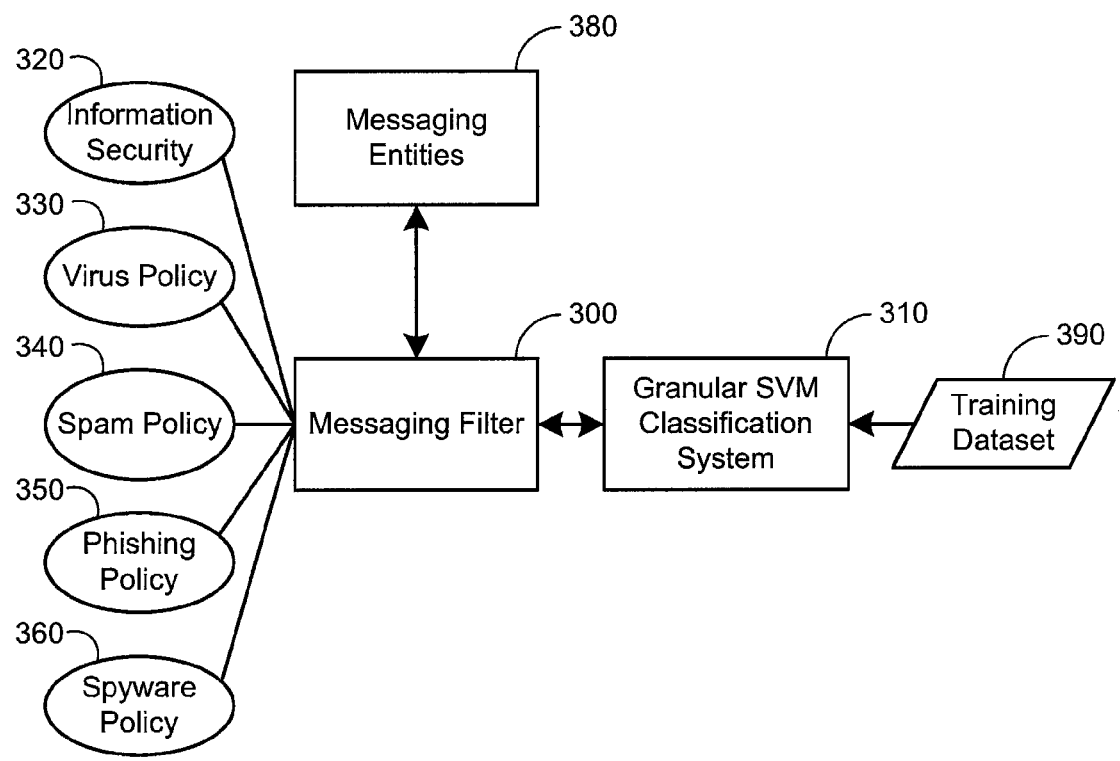
FIG. 3 is a block diagram of a messaging filter using a classification system and illustrating example policies.

FIG. 3 is a block diagram of a messaging filter 300 using a classification system 310 and illustrating example policies 320-360. In various implementations, the policies can include an information security policy 320, a virus policy 330, a spam policy 340, a phishing policy 350, a spyware policy 360, or combinations thereof. The messaging filter 300 can filter communications received from messaging entities 380 destined for other messaging entities 380.

In some implementations, the messaging filter 300 can query a classification system 310 to identify a classification associated with a message. The classification system 310 can use a granular support vector machine process to identify hyperplane classifiers associated with a number of granules derived from a training dataset 390. The training dataset can include, for example, documents that have previously been classified. In some examples, the documents can be a library of spam messages identified by users and/or provided by third parties. In other examples, the documents can be a library of viruses identified by administrators, users, and/or other systems or devices. The hyperplane classifiers can then be compared to the attributes of new messages to determine to which classification the new message belongs.

In other implementations, the messaging filter 300 can also query a reputation system. Reputation systems are described in U.S. patent application Ser. No. 11/142,943, entitled "Systems and Methods for Classification of Messaging Entities," filed on Jun. 2, 2005, which is hereby incorporated by reference.

In those implementations that include an information security policy, incoming and/or outgoing messages can be classified and compared to the information security policy to determine whether to forward the message for delivery. For example, the classification system might determine that the document is a technical specification document. In such an example, the information security policy, for example, might specify that technical specification documents should not be forwarded outside of an enterprise network, or only sent to specific individuals. In other examples, the information security policy could specify that technical documents require encryption of a specified type so as to ensure the security of the technical documents being transmitted. Other information security policies can be used.

In those implementations that include a virus policy, the virus policy can specify a risk level associated with communications that are acceptable. For example, the virus policy can indicate a low tolerance for viruses. Using such a policy, the messaging filter can block communications that are determined to be even a low risk for including viruses. In other examples, the virus policy can indicate a high tolerance for virus activity. In such examples, the messaging filter might only block those messages which are strongly correlated with virus activity. For example, in such implementations, a confidence metric can be associated with the classification. If the confidence metric exceeds a threshold level set by the virus policy, the message can be blocked. Other virus policies can be used.

In those implementations that include a spam policy, the spam policy can specify a risk level associated with communications that is acceptable to the enterprise network. For example, a system administrator can specify a high tolerance for spam messages. In such an example, the messaging filter 300 can filter only messages that are highly correlated with spam activity.

In those implementations that include a phishing policy, the phishing policy can specify a risk level associated with communications that are acceptable to the enterprise network. For example, a system administrator can specify a low tolerance for phishing activity. In such an example, the messaging filter 300 can filter even communications which show a slight correlation to phishing activity.

In those implementations that include a spyware policy, the spyware policy can specify a network tolerance for communications that might include spyware. For example, an administrator can set a low tolerance for spyware activity on the network. In such an example, the messaging filter 300 can filter communications that show even a slight correlation to spyware activity.

Figure 4:
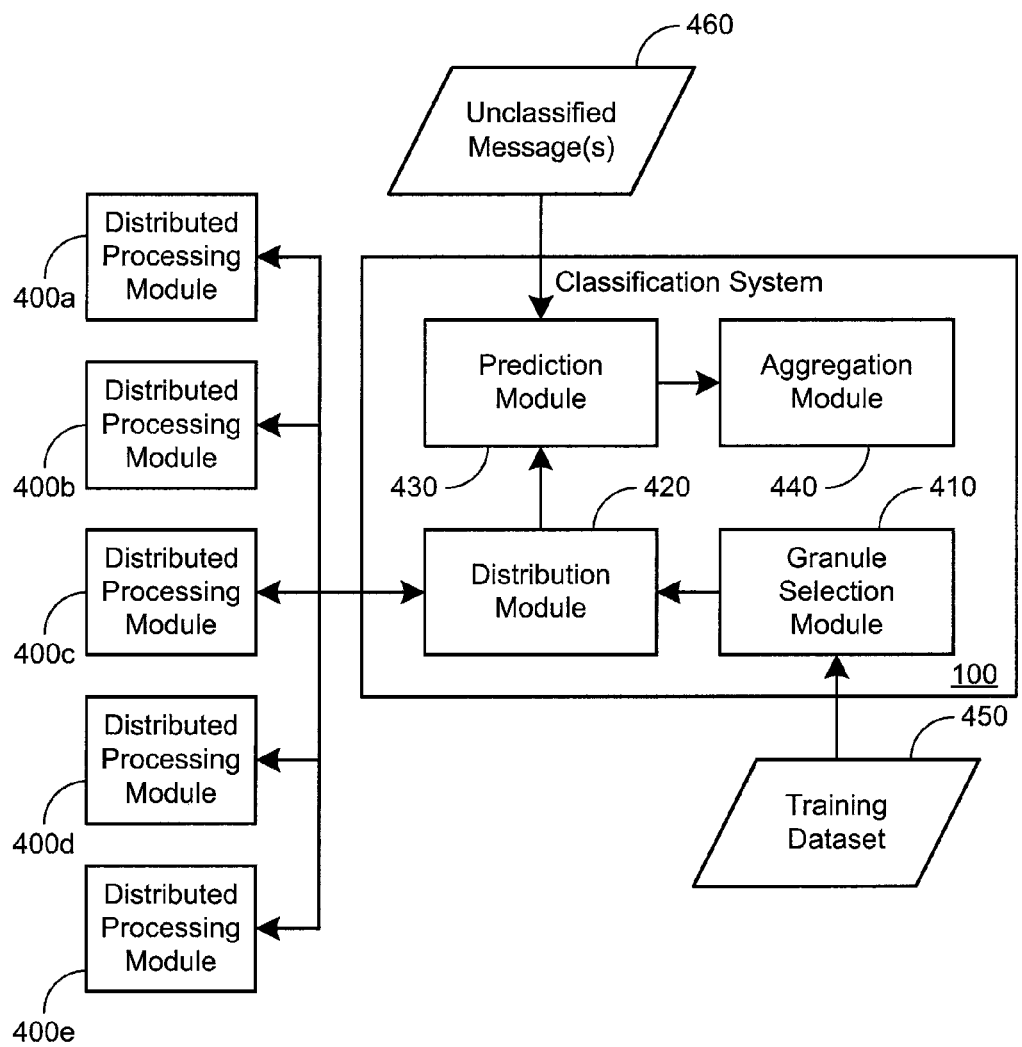
FIG. 4 is a block diagram of an example distributed classification system.

FIG. 4 is a block diagram of an example classification system 100 using distributed processing modules 400*a-e*. In some implementations, the classification system 100 can include a granule selection module 410, a distribution module 420, a prediction module 430 and an aggregation module 440. The classification system can operate to receive a training dataset 450, to derive a number of hyperplane classifiers from the training dataset, and then to predict the classification of incoming unclassified messages 460.

In some implementations, the granule selection module can receive the training dataset 450. The training dataset 450 can be provided, for example by a system administrator or a third party device. In some implementations, the training dataset 450 can include a plurality of records (e.g., tuples) which have previously been classified. In other implementations, the training dataset 450 can include a corpus of documents that have not been parsed. The granule selection module 410, in such implementations, can include a parser operable to extract attributes from the document corpus. In some implementations, the granule selection module 410 can randomly select granules by using a bootstrapping process on the tuples, and then projecting the tuples into a random subspace.

The distribution module 420 can operate to distribute the granules to a plurality of processing modules 400*a-e* for processing. In some implementations, the distribution module 420 can distribute the granules to processing modules 400*a-e* having the highest available processing capacity. In other implementations, the distribution module 420 can distribute the granules to processing modules 400*a-e* based upon the type of content being classified. In still further implementations, the distribution module 420 can distribute the granules to processing modules 400*a-e* based upon other characteristics of the processing modules 400*a-e* (e.g., availability of special purpose processing power (e.g., digital signal processing, etc.)).

In some implementations, the distributed processing modules 400*a-e* can return a hyperplane classifier to the distribution module 420. The hyperplane classifiers can be provided to the prediction module 430. The prediction module 430 can also receive unclassified messages 460 and can use the hyperplane classifiers to provide granule classification predictions associated with each of the hyperplane classifiers.

The granule classification predictions can be provided to an aggregation module 440. The aggregation module 440 can operate to aggregate the granule classification predictions. In some implementations, the aggregation module 440 can aggregate the granule classification predictions to derive a final classification prediction based upon a simple voting process. In other implementations, the aggregation module 440 can use a distance metric associated with each of the granule classification predictions to weight the respective granule predictions. In still further implementations, the aggregation module 440 can use a Bayesian confidence score to weight each of the granule classification predictions. The Bayesian confidence score can be derived, for example, by validating the each respective hyperplane classifier associated with a granule against out-of-bag data not selected for inclusion in the granule. The resulting final classification prediction can be provided as output of the classification system 100.

Figure 5:
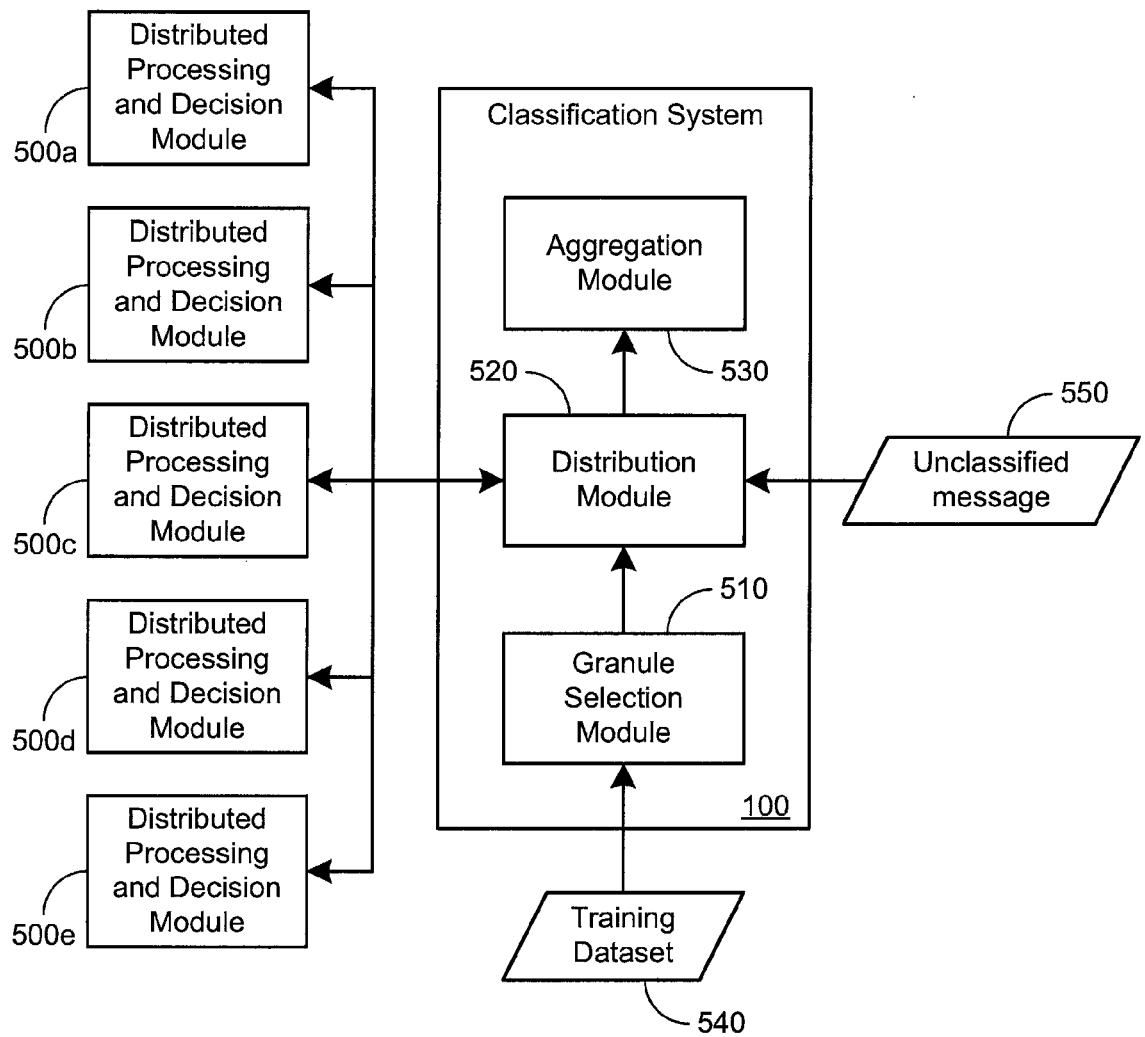
FIG. 5 is a block diagram of another example distributed classification system.

FIG. 5 is a block diagram of another example classification system 100 having distributed processing and prediction modules 500*a-e*. In some implementations, the classification system 100 can include a granule selection module 510, a distribution module 520 and an aggregation module 530. The classification system 100 can operate to distribute the processing associated with both the granule processing to derive the hyperplane classifiers associated with the granules and the prediction processing to provide granule predictions based upon the derived hyperplane classifiers.

In some implementations, the granule selection module 510 can receive the training dataset 540. The training dataset 540 can be provided, for example by a system administrator or a third party device. In some implementations, the training dataset 540 can include a plurality of records (e.g., tuples) which have previously been classified. In other implementations, the training dataset 540 can include a corpus of documents that have not been parsed. The granule selection module 510, in such implementations, can include a parser operable to extract attributes from the document corpus. In some implementations, the granule selection module 510 can randomly select granules by using a bootstrapping process on the tuples, and then projecting the tuples into a random subspace.

In some implementations, the distribution module 520 can received the granules from the granule selection module 520. The distribution module 520 can distribute the granules to one or more distributed processing and prediction modules 500*a-e*. The distribution module 520 can also distribute an unclassified message to the distributed processing and prediction modules 500*a-e*.

Each distributed processing and prediction modules 500*a-e* can operate to execute a support vector machine process on the receive granule(s). The support vector machine process can operate to derive a hyperplane classifier(s) associated with the granule(s). Each distributed processing and prediction modules 500*a-e* can then use the derived hyperplane classifier(s) to generate a granule classification prediction (or predictions) associated with an unclassified message 550.

The granule classification predictions can be provided to an aggregation module 530. The aggregation module 530 can operate to aggregate the granule classification predictions. In some implementations, the aggregation module 530 can aggregate the granule classification predictions to derive a final classification prediction based upon a simple voting process. In other implementations, the aggregation module 530 can use a distance metric associated with each of the granule classification predictions to weight the respective granule predictions. In still further implementations, the aggregation module 530 can use a Bayesian confidence score to weight each of the granule classification predictions. The Bayesian confidence score can be derived, for example, by validating the each respective hyperplane classifier associated with a granule against out-of-bag data not selected for inclusion in the granule. The resulting final classification prediction can be provided as output of the classification system 100.

Figure 6:
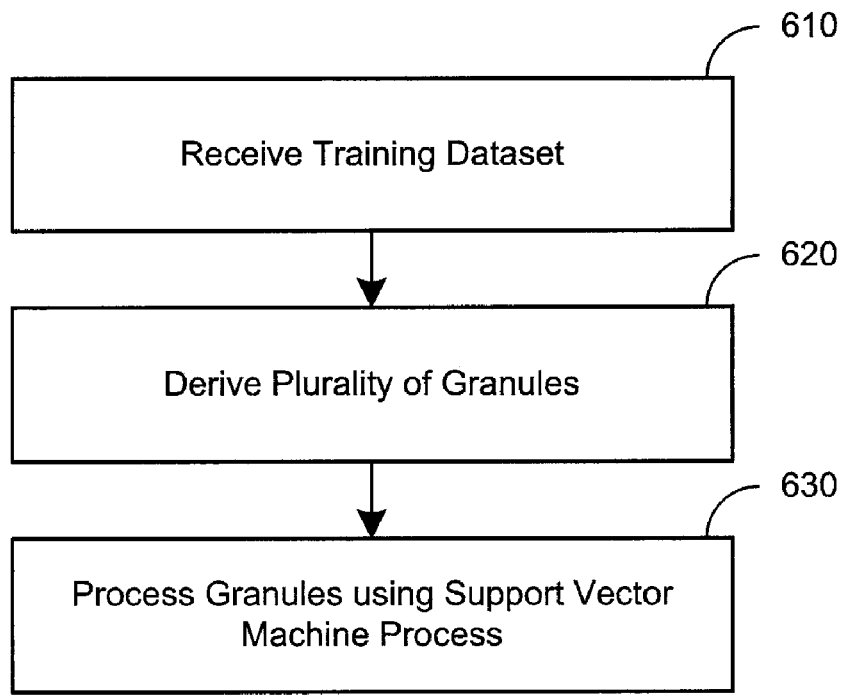
FIG. 6 is a flowchart illustrating an example method used to derive granules and classification planes.

FIG. 6 is a flowchart illustrating an example method used to derive granules and classification planes. At stage 610, a training dataset is received. The training dataset can be received, for example, by a granule selection module (e.g., classification system 100 of FIG. 2). The training dataset, in various examples, can include parsed or unparsed data describing attributes of an item for classification. In some examples, the item can include documents, deoxyribonucleic acid (DNA) sequences, chemicals, or any other item that has definite and/or quantifiable attributes that can be compiled and analyzed. In other examples, the training dataset can include a document corpus operable to be parsed to identify attributes of each document in the document corpus.

At stage 620, a plurality of granules are derived. The plurality of granules can be derived, for example, by a granule selection module (e.g., granule selection module 210 of FIG. 2). In various implementations, the granule selection module can use a bootstrapping process to identify a random sampling of a received training dataset. The granule selection module can then project the random sampling into a random subspace, thereby producing a granule. In various implementations, the granule is much smaller than the original dataset, which can facilitate more efficient processing of the granule than can be achieved using the entire training dataset. In some implementations, the granule further supports distributed processing, thereby facilitating the parallel processing of the derived granules.

At stage 630, the granules are processed using a support vector machine process. The granules can be processed, for example, by a processing module (e.g., processing module 220 of FIG. 2). The support vector machine process can operate to derive a hyperplane classifier associated with each granule. The hyperplane classifiers can be used to provide demarcations between given classifications of the data (e.g., spam or non-spam, virus or non-virus, spyware or non-spyware, etc.).

Figure 7:
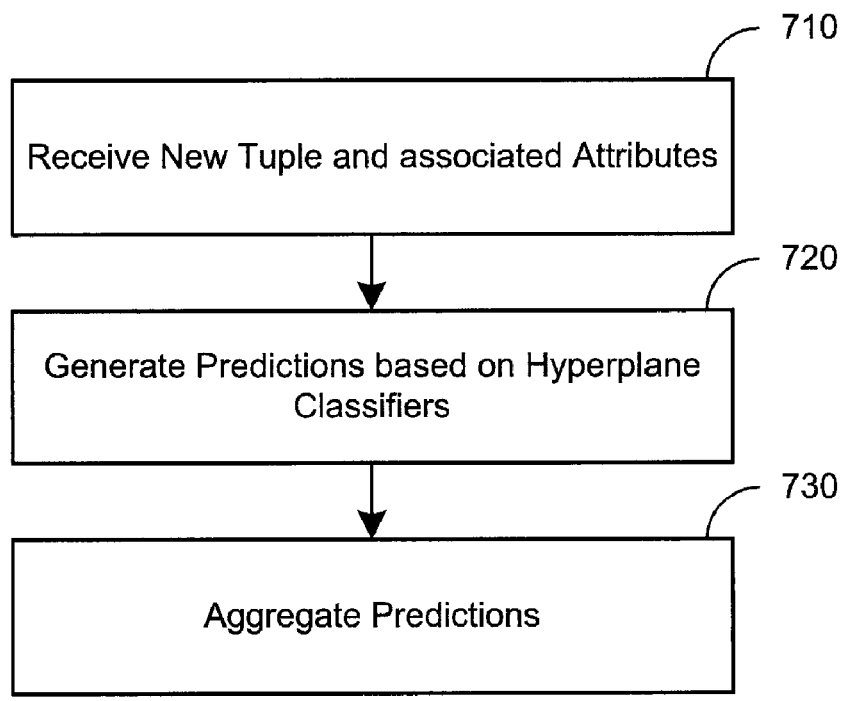
FIG. 7 is a flowchart illustrating an example method used to derive classification associated with a new set of attributes for classification.

FIG. 7 is a flowchart illustrating an example method used to derive classification associated with a new set of attributes for classification. At stage 710 a new tuple and associated attributes can be received. The new tuple and associated attributes can be received, for example, by a prediction module (e.g., classification system 100 of FIG. 2).

At stage 720 a prediction can be generated based upon each hyperplane classifier. The prediction can be generated, for example, by a prediction module (e.g., prediction module 230 of FIG. 2). In various implementations, the prediction module can use the derived hyperplane classifiers to generate a granule classification prediction associated with each hyperplane classifier.

At stage 730, the granule classification predictions from each of the hyperplane classifiers can be aggregated. The predictions can be aggregated, for example, by an aggregation module (e.g., aggregation module 240 of FIG. 2). In various implementations, the granule classification predictions can be aggregated using a simple voting process, a distance between the datapoint and the hyperplane classifiers can be used to factor the final classification, or a Bayesian confidence can be used to weight the predictions based upon the confidence associated with the respective hyperplane classifiers.

Figure 8:
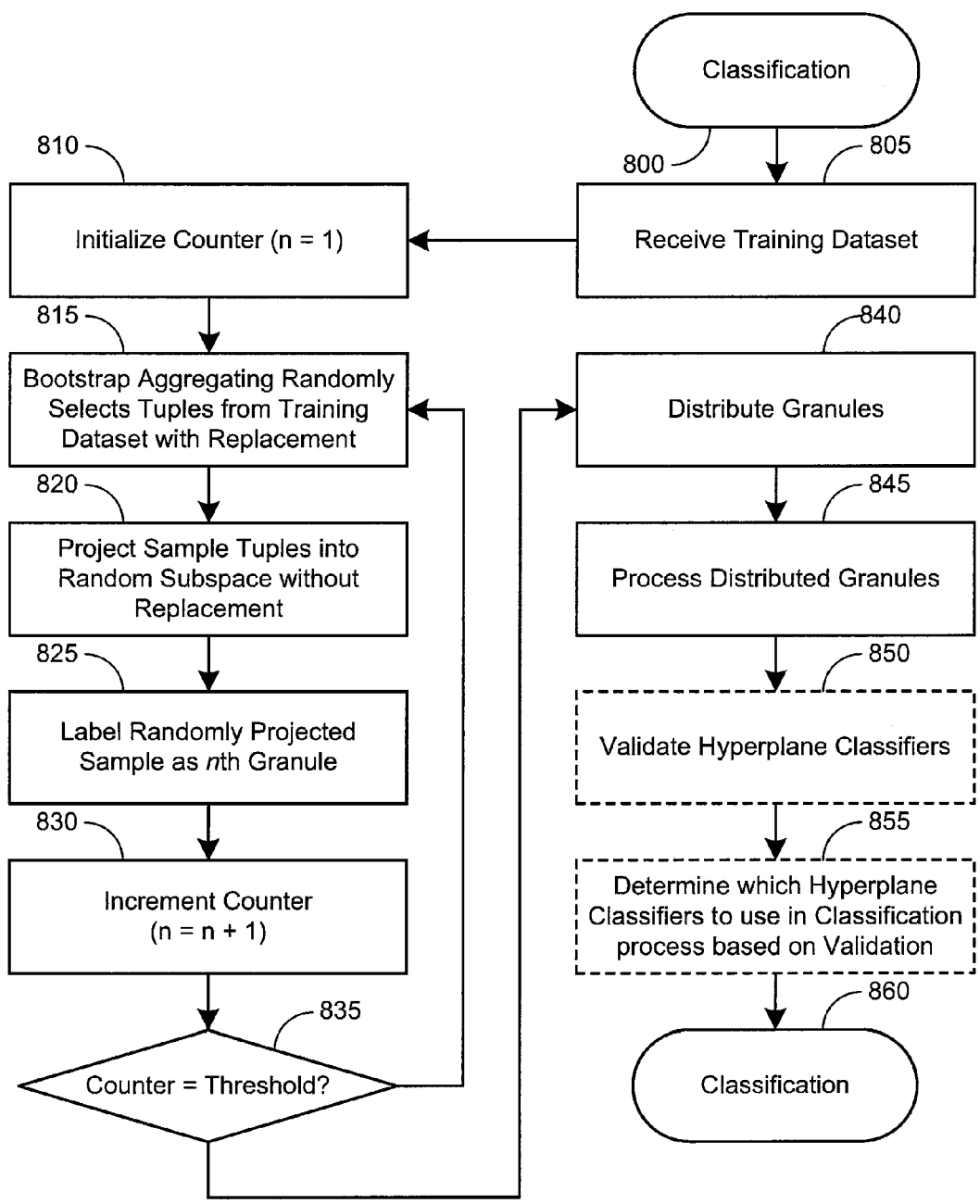
FIG. 8 is a flowchart illustrating an example method used to derive granules and distribute granules to processing modules.

FIG. 8 is a flowchart illustrating an example method used to derive granules and distribute granules to processing modules. The method is initialized at stage 800. At stage 805, a training dataset is received. The training dataset can be received, for example, by a granule selection module (e.g., classification system 100 of FIG. 2). The training dataset, in various examples, can include parsed or unparsed data describing attributes of an item for classification. In some examples, the item can include documents, deoxyribonucleic acid (DNA) sequences, chemicals, or any other item that has definite and/or quantifiable attributes that can be compiled and analyzed. In other examples, the training dataset can include a document corpus operable to be parsed to identify attributes of each document in the document corpus.

At stage 810, a counter can be initialized. The counter can be initialized, for example, by a granule selection module (e.g., granule selection module 210 of FIG. 2). In various implementations, the counter can be used to identify when enough granules have been generated based on the training dataset. For example, the number of granules for a given dataset can be a percentage (e.g., 50%) of the number of tuples in the training dataset.

At stage 815, a bootstrap aggregating process is used to randomly select tuples from among the training dataset. The bootstrap aggregating process can be performed, for example, by a granule selection module (e.g., granule selection module 210 of FIG. 2). In various implementations, the bootstrap aggregating process randomly selects a tuple from the training dataset, and replaces the tuple before selecting another tuple, until a predefined number of selections have been made. In such implementations, duplicates can be selected. Thus, it is unknown how many tuples will be selected prior to the bootstrap aggregating process, though it does ensure that the number of samples will be no greater than the number of selections made. In some examples, the predefined number of selections can be based upon a percentage (e.g., 10%) of the size of the training dataset.

At stage 820, the random sample of tuples is projected into a random subspace. The projection into a random subspace can be performed, for example, by a granule selection module (e.g., granule selection module 210 of FIG. 2). The random subspace can be selected, in some implementations, by randomly selecting the features to be used within the granule, without replacement. For example, when a first feature is selected, the feature is not replaced into the group, but removed so as not to be selected a second time. Such random selection guarantees that the granule will include a predefined number of features in each granule.

At stage 825, the generated granule is labeled as the nth granule, where n is the current counter value. The granule can be labeled, for example, by a granule selection module (e.g., granule selection module 210 of FIG. 2).

At stage 830, the counter is incremented (n=n+1). The counter can be incremented, for example, by a granule selection module (e.g., granule selection module 210 of FIG. 2). At stage 835, the counter can be compared to a threshold to determine whether a predefined number of granules have been generated. If a predefined number of granules have not been generated, the process returns to stage 815 and generates additional granules until the specified number of granules have been generated.

However, if the counter has reached the threshold at stage 835, the process can continue to stage 840 where the granules can be distributed. The granules can be distributed, for example, by a distribution module (e.g., distribution module 420, 520 of FIGS. 4 and 5, respectively). In various implementations, the granules can be distributed based upon the characteristics of a plurality of processing modules or the characteristics of the granules themselves.

At stage 845, the granules can be processed. The granules can be processed, for example, by distributed processing module (e.g., distributed processing modules 400*a-e*, 500*a-e* of FIGS. 4 and 5, respectively). In some implementations, the distributed processing modules can be executed by multiple processors. In additional implementations, the distributed processing modules can execute a support vector machine process on each generated granule to derive a hyperplane classifier associated with each generated granule. The hyperplane classifier can be compared to unclassified data to derive a classification prediction associated with the unclassified data.

At optional stage 850, the hyperplane classifiers can be validated. The hyperplane classifiers can be validated, for example, by distributed processing modules (e.g., distributed processing modules 400*a-e*, 500*a-e* of FIGS. 4 and 5, respectively). In some implementations, each hyperplane classifier can be validated using respective out-of-bag data associated with the granule used to generate the hyperplane classifier. Thus, each hyperplane classifier can be tested to determine the effectiveness of the derived hyperplane classifier.

At optional stage 855, a determination is made which hyperplane classifiers to use in prediction modules based upon the validation. The determination of which hyperplane classifiers to use can be performed, for example, by a distributed processing module (e.g., distributed processing modules 400*a-e*, 500*a-e* of FIGS. 4 and 5, respectively). In some implementations, a threshold effectiveness level can be identified whereby if the validation does not meet the threshold, it is not used for predicting classifications for unclassified datasets. For example, if a hyperplane classifier is validated as being correct less than 50% of the time, the classification associated with the hyperplane classifier is incorrect more often than it is correct. In some implementations, such hyperplane classifier can be discarded as misleading with respect to the final classification prediction.

The method ends at stage 860. The method can be used to efficiently derive a plurality of hyperplane classifiers associated with a training dataset by distributing the granules for parallel and/or independent processing. Moreover, inaccurate hyperplane classifiers can be discarded in some implementations.

In various implementations of the above description, message filters can forward, drop, quarantine, delay delivery, or specify messages for more detailed testing. In some implementations, the messages can be delayed to facilitate collection of additional information related to the message.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A method comprising:
   receiving a training dataset comprising a plurality of tuples and a plurality of attributes for each of the tuples;
   deriving a plurality of granules from the training dataset, each granule comprising a plurality of sample tuples and a plurality of sample attributes, wherein for each of the plurality of granules:
   the plurality of sample tuples is randomly selected from among the plurality of tuples with replacement; and
   the plurality of sample attributes is randomly selected from among the plurality of attributes without replacement;
   processing the granules using a support vector machine process to identify a hyperplane classifier associated with each of the granules;
   predicting a classification of a new tuple using each of the hyperplane classifiers to produce a plurality of predictions;
   aggregating the predictions to derive a decision on a final classification of the new tuple;
   validating a first hyperplane classifier associated with a granule by classifying a plurality of tuples from the training dataset which were not included in the granule;
   generating a hyperplane classifier effectiveness level based upon the validation of the first hyperplane classifier against tuples from the training dataset which were not included in the granule;
   determining whether the hyperplane classifier effectiveness level exceeds a threshold effectiveness level; and
   in response to determining that the hyperplane classifier effectiveness level does not exceed the threshold effectiveness level:
   removing the first hyperplane classifier; and
   requesting a second plurality of sample attributes, each sample attribute in the second plurality of sample attributes different from each sample attribute in the plurality of sample attributes, for use in identifying new hyperplane classifiers.

2. The method of claim 1, wherein the selection of granule tuples and granule attributes for each granule is independent of the selection of granule tuples and granule attributes for other granules.

3. The method of claim 1, wherein the training dataset comprises a relational database of tuples with associated attributes, each of the tuples having a known classification.

4. The method of claim 1, wherein aggregating the predicted classifications comprises weighting the predictions based upon hyperplane classifier effectiveness levels associated with the granules, respectively, and aggregating the weighted predictions.

5. The method of claim 1, further comprising:
   weighting the predictions based upon a distance of the new tuple from the hyperplane classifiers, respectively; and aggregating the weighted predictions.

6. The method of claim 1, wherein each of the predictions comprises a vote, and aggregating the predictions comprises adding the votes together and determining which classification is most common.

7. The method of claim 1, wherein the tuples are gene sequences and the attributes are features of the gene sequences, whereby the method is operable to determine whether a gene sequence is likely to share known characteristics of other gene sequences.

8. The method of claim 1, wherein the tuples are documents and the attributes are features of the documents, whereby the method is operable to determine whether a document is likely to share known characteristics of other documents.

9. The method of claim 8, wherein the known characteristics comprise one or more of spam characteristics, virus characteristics, spyware characteristics, or phishing characteristics, and the method is operable to determine whether the new tuple should be classified as including one or more of the known characteristics.

10. The method of claim 1, wherein processing the granules comprises processing the granules on a plurality of processors in parallel, the processors being operable to operate support vector machines to identify hyperplane classifiers associated with the granules.

11. The method of claim 10, further comprising selecting the plurality of processors based upon the processing power available on the respective processors.

12. A system for performing the disclosed methods) comprising:
   one or more computers;
   one or more memory devices in data communication with the one or more computers and storing instructions defining:
   a granule selection module operable to select a plurality of granules from a training dataset, each of the granules comprising a plurality of tuples and a plurality of attributes, wherein, for each of the plurality of granules, the plurality of tuples are randomly selected with replacement and the plurality of attributes are randomly selected without replacement;

a plurality of granule processing modules operable to process granules using a support vector machine process to identify a hyperplane classifier associated with each of the granules;

one or more prediction modules operable to predict a classification associated with an unknown tuple based upon the hyperplane classifiers to produce a plurality of granule predictions; and an aggregation module operable to aggregate the granule predictions to derive a decision on a final classification associated with the unknown tuple; and a validation module operable to:
    validate a first hyperplane classifier associated with a granule by attempting to classify a plurality of tuples from the training dataset which were not included in the granule;
    generate a hyperplane classifier effectiveness level based upon the validation of the first hyperplane classifier against tuples from the training dataset which were not included in the granule;
    determine whether the hyperplane classifier effectiveness level exceeds a threshold effectiveness level; and
    in response to determining that the hyperplane classifier effectiveness level does not exceed the threshold effectiveness level:
        remove the first hyperplane classifier; and
        request a second plurality of attributes, each attribute in the second plurality of sample attributes different from each attribute in the plurality of attributes, for use in identifying new hyperplane classifiers.

13. The system of claim 12, wherein the unknown tuple comprises features of an unclassified document, and the system further comprises a parsing module operable to parse the unclassified document to derive a plurality of unclassified attributes associated with the unknown tuple.

14. The system of claim 13, wherein the one or more prediction modules are operable to extract a portion of the unclassified attributes based upon the granule and the hyperplane classifier, and is operable to compare the unclassified attributes to the hyperplane classifier to derive the prediction associated with the granule.

15. The system of claim 14, wherein the one or more prediction modules are operable to generate a prediction for each of the hyperplane classifiers to produce the plurality of granule predictions.

16. The system of claim 15, wherein the aggregation module is operable to count each of the predictions as a vote, and to derive a final prediction based upon which of the classifications accumulates the most votes.

17. The system of claim 12, wherein each prediction includes a distance metric from the hyperplane classifier, and the aggregation module is operable to weight each prediction based upon the associated distance metric.

18. The system of claim 12, wherein the plurality of granule modules are operable to be processed independently.

19. The system of claim 12, wherein the plurality of granule processing modules are operable to be processed in parallel.

20. The system of claim 12, wherein the plurality of granule processing modules are operable to be executed by separate processors.

21. The system of claim 12, wherein the system is operable to classify a tuple as one or more of a spam risk, a phishing risk, a virus risk, or a spyware risk.

22. A method comprising:
receiving a training dataset comprising a plurality of tuples and a plurality of attributes for each of the tuples;
deriving a plurality of granules from the training dataset, each granule comprising a plurality of sample tuples and a plurality of sample attributes, wherein for each of the plurality of granules:
    the plurality of sample tuples is randomly selected from among the plurality of tuples with replacement; and
    the plurality of sample attributes is randomly selected from among the plurality of attributes without replacement;
processing the granules using a support vector machine process to identify a hyperplane classifier associated with each of the granules;
predicting a classification of a new tuple using each of the hyperplane classifiers to produce a plurality of predictions;
aggregating the predictions to derive a decision on a final classification of the new tuple;
validating a first hyperplane classifier associated with a granule by attempting to classify a plurality of tuples from the training dataset which were not included in the granule;
generating a hyperplane classifier effectiveness level based upon the validation of the first hyperplane classifier against tuples from the training dataset which were not included in the granule;
determining whether the hyperplane classifier effectiveness level exceeds a threshold effectiveness level; and
in response to determining that the hyperplane classifier effectiveness level does not exceed the threshold effectiveness level:
    removing the first hyperplane classifier; and
    requesting a new training dataset for use in identifying new hyperplane classifiers, wherein the new training dataset does not include data from the training dataset.

23. A computer program product, encoded on a computer-readable medium, operable to cause one or more processors to perform operations comprising:
receiving a training dataset comprising a plurality of tuples and a plurality of attributes for each of the tuples;
deriving a plurality of granules from the training dataset, each granule comprising a plurality of sample tuples and a plurality of sample attributes, wherein for each of the plurality of granules:
    the plurality of sample tuples is randomly selected from among the plurality of tuples with replacement; and
    the plurality of sample attributes is randomly selected from among the plurality of attributes without replacement;
processing the granules using a support vector machine process to identify a hyperplane classifier associated with each of the granules;
predicting a classification of a new tuple using each of the hyperplane classifiers to produce a plurality of predictions;
aggregating the predictions to derive a decision on a final classification of the new tuple;
validating a first hyperplane classifier associated with a granule by attempting to classify a plurality of tuples from the training dataset which were not included in the granule;

generating a hyperplane classifier effectiveness level based upon the validation of the first hyperplane classifier against tuples from the training dataset which were not included in the granule;

determining whether the hyperplane classifier effectiveness level exceeds a threshold effectiveness level; and in response to determining that the hyperplane classifier effectiveness level does not exceed the threshold effectiveness level:

removing the first hyperplane classifier; and requesting a new training dataset for use in identifying new hyperplane classifiers, wherein the new training dataset does not include data from the training dataset.

* * * * *

UNITED STATES PATENT AND TRADEMARK OFFICE
CERTIFICATE OF CORRECTION

PATENT NO. : 8,160,975 B2
APPLICATION NO. : 12/020253
DATED : April 17, 2012
INVENTOR(S) : Yuchun Tang and Yuanchen He It is certified that error appears in the above-identified patent and that said Letters Patent is hereby corrected as shown below:

Claim 12, Column 14, Line 55, delete "for performing the disclosed methods)" and insert -- system --, therefor.

Claim 12, Column 15, Line 8, delete "predictions; and" and insert -- predictions; --, therefor.

Claim 12, Column 15, Line 30, delete "of sample" and insert -- of --, therefor.

Page 1 of 1

Signed and Sealed this
Third Day of July, 2012

David J. Kappos
*Director of the United States Patent and Trademark Office*